United States Patent
Gorbold et al.

(10) Patent No.: US 11,608,109 B2
(45) Date of Patent: Mar. 21, 2023

(54) SYSTEMS AND METHODS FOR DETECTING MAGNETIC TURN COUNTER ERRORS WITH REDUNDANCY

(71) Applicant: Analog Devices International Unlimited Company, County Limerick (IE)

(72) Inventors: Jeremy Richard Gorbold, Newbury (GB); Gavin Patrick Cosgrave, Enniscorthy (IE)

(73) Assignee: Analog Devices International Unlimited Company, Limerick (IE)

( * ) Notice: Subject to any disclaimer, the term of this patent is extended or adjusted under 35 U.S.C. 154(b) by 294 days.

(21) Appl. No.: 16/991,788

(22) Filed: Aug. 12, 2020

(65) Prior Publication Data

US 2022/0048559 A1 Feb. 17, 2022

(51) Int. Cl.
*B62D 5/04* (2006.01)
*B62D 15/02* (2006.01)
*G01B 7/30* (2006.01)
*G01D 5/16* (2006.01)
*G01D 18/00* (2006.01)
*G07C 5/08* (2006.01)

(52) U.S. Cl.
CPC ........... *B62D 5/049* (2013.01); *B62D 15/021* (2013.01); *G01B 7/30* (2013.01); *G01D 5/16* (2013.01); *G01D 18/00* (2013.01); *G07C 5/0816* (2013.01)

(58) Field of Classification Search
CPC .... B62D 5/049; B62D 15/021; B62D 5/0496; B62D 15/0215; B62D 15/045; G01B 7/30; G01D 5/16; G01D 18/00; G01D 5/24461; G01D 5/24457
See application file for complete search history.

(56) References Cited

U.S. PATENT DOCUMENTS

| 6,870,470 B2 | 3/2005 | Nomura et al. |
| 8,115,479 B2 | 2/2012 | Aimuta et al. |
| 8,471,552 B2 | 6/2013 | Suzuki |

(Continued)

FOREIGN PATENT DOCUMENTS

| DE | 102010064201 A1 | 6/2012 |
| EP | 0381963 A1 | 8/1990 |

(Continued)

OTHER PUBLICATIONS

International Search Report and Written Opinion dated Oct. 27, 2021 in application No. PCT/EP2021/070798.

*Primary Examiner* — Marthe Y Marc-Coleman

(74) *Attorney, Agent, or Firm* — Knobbe, Martens, Olson & Bear, LLP

(57) ABSTRACT

Systems and methods for detecting magnetic turn counter errors with redundancy are provided. In one aspect, a magnetic field turn sensor system includes a magnetic field angle sensor having a sine bridge and a cosine bridge and first to third comparators configured to compare the outputs from the sine and cosine bridges. The system further includes a processor configured to receive outputs from each of the first to third comparators, determine that a combination of the outputs from the first to third comparators corresponds to an invalid state, and indicate a fault in response to determining that the combination of the outputs from the first to third comparators corresponds to the invalid state.

20 Claims, 10 Drawing Sheets

(56) References Cited

U.S. PATENT DOCUMENTS

| | | |
|---|---|---|
| 8,884,610 B2 | 11/2014 | Van Veldhoven et al. |
| 9,310,448 B2 | 4/2016 | Kuwano |
| 9,475,520 B2 | 10/2016 | Yanai et al. |
| 9,506,996 B2 | 11/2016 | Granig |
| 9,663,140 B2 | 5/2017 | Sone |
| 9,664,752 B2 | 5/2017 | Monreal et al. |
| 10,073,136 B2 | 9/2018 | Milano et al. |
| 10,156,461 B2 | 12/2018 | Snyder et al. |
| 10,267,870 B2 | 4/2019 | Cosgrave et al. |
| 10,309,803 B2 | 6/2019 | Cosgrave et al. |
| 10,921,373 B2 * | 2/2021 | Lassalle-Balier ...... G01R 33/09 |
| 2011/0246133 A1 | 10/2011 | Harada et al. |
| 2012/0116717 A1 | 5/2012 | Satou et al. |
| 2016/0167701 A1 | 6/2016 | Sone |
| 2016/0245677 A1 | 8/2016 | Cosgrave et al. |
| 2016/0288823 A1 | 10/2016 | Mikamo |
| 2017/0356762 A1 * | 12/2017 | David .................... G01D 5/142 |
| 2018/0216965 A1 | 8/2018 | Richard et al. |
| 2018/0231400 A1 | 8/2018 | Okumura et al. |
| 2018/0356252 A1 | 12/2018 | Diegel et al. |
| 2019/0310113 A1 | 10/2019 | Riedmueller et al. |
| 2019/0323819 A1 | 10/2019 | Zimmer et al. |
| 2019/0346287 A1 | 11/2019 | Koike et al. |
| 2019/0351940 A1 | 11/2019 | Kozuka et al. |
| 2020/0025842 A1 | 1/2020 | Baumann et al. |
| 2020/0062300 A1 | 2/2020 | Kuwahara et al. |
| 2020/0348150 A1 * | 11/2020 | Cesaretti .................. G01D 5/16 |
| 2022/0049976 A1 | 2/2022 | Cosgrave et al. |

FOREIGN PATENT DOCUMENTS

| | | |
|---|---|---|
| EP | 2912411 A1 | 9/2015 |
| EP | 3 451 526 | 5/2020 |
| JP | 2012-230021 | 11/2012 |
| JP | 5315212 B2 | 10/2013 |
| JP | 6616414 B2 | 12/2019 |
| JP | 2020-003316 | 1/2020 |
| WO | WO 2016/014193 | 1/2016 |

* cited by examiner

SYSTEMS AND METHODS FOR DETECTING MAGNETIC TURN COUNTER ERRORS WITH REDUNDANCY

FIELD OF THE DISCLOSURE

Embodiments of the invention relate to electronic systems, and more particularly to, systems and methods for detecting sensor errors through magnetic turn counter sensing elements.

BACKGROUND

Magnetic sensors can be implemented to obtain linear or circular position or angle information of a mechanical component, such as a shaft, in various applications, including an automotive steering system. Magnetic sensing elements used in magnetic angle sensors often suffer from changing sensitivity levels and non-linearity errors due to, for example, temperature change, and it is desirable to implement sensor error detection mechanism for magnetic sensors.

SUMMARY OF THE DISCLOSURE

The methods and devices of the described technology each have several aspects, no single one of which is solely responsible for its desirable attributes.

In one aspect, there is provided a magnetic field turn sensor system, comprising: a magnetic field angle sensor having a first bridge having a positive output and a negative output and a second bridge having a positive output and a negative output; a first comparator configured to compare the positive and negative outputs of the first bridge; a second comparator configured to compare the positive and negative outputs of the second bridge; a third comparator configured to compare a first one of the positive and negative outputs of the first bridge to a first one of the positive and negative outputs of the second bridge; and a processor configured to: receive outputs from each of the first to third comparators, determine that a combination of the outputs from the first to third comparators corresponds to an invalid state, and indicate a fault in response to determining that the combination of the outputs from the first to third comparators corresponds to the invalid state.

The processor can be further configured to: determine a quadrant of the magnetic field angle sensor based at least in part on the outputs from the first and second comparators.

The received outputs can comprise first outputs received at a first time, and the processor can be further configured to: receive second outputs from each of the first to third comparators at a second time, determine that a transition between a first state including a combination of the first outputs to a second state including a combination of the second outputs corresponds to an invalid transition, and indicate the fault in response to determining that the transition corresponds to an invalid transition.

The first bridge can comprise a sine bridge and the second bridge can comprise a cosine bridge.

The system can further comprise: a fourth comparator configured to compare a second one of the positive and negative outputs of the sine bridge to a second one of the positive and negative outputs of the cosine bridge, wherein the processor is further configured to: receive an output from the fourth comparator, wherein the determination that the combination of the outputs corresponds to the invalid state is further based on the output from the fourth comparator.

The second one of the positive and negative outputs of the sine bridge can be the same as the first one of the positive and negative outputs of the sine bridge and the second one of the positive and negative outputs of the cosine bridge can be different from the first one of the positive and negative outputs of the cosine bridge.

The processor can be further configured to: determine an octant of the magnetic field angle sensor based at least in part on the outputs from the first to fourth comparators.

The received outputs can comprise first outputs received at a first time, and the processor can be further configured to: receive second outputs from each of the first to fourth comparators at a second time, determine that a transition between a first state including a combination of the first outputs to a second state including a combination of the second outputs corresponds to an invalid transition, and indicate the fault in response to determining that the transition corresponds to an invalid transition.

The system can be configured to consume less power than a power consumption budget provided for diagnostic components of an Electric Power Assisted Steering (ePAS) system.

Another aspect is a motor control system configured to control a vehicle, comprising: a shaft connected to a steering wheel of the vehicle; and a magnetic field turn sensor system comprising: a magnetic field angle sensor having a first bridge having a positive output and a negative output and a second bridge having a positive output and a negative output, a first comparator configured to compare the positive and negative outputs of the first bridge, a second comparator configured to compare the positive and negative outputs of the second bridge, a third comparator configured to compare a first one of the positive and negative outputs of the first bridge to a first one of the positive and negative outputs of the second bridge, and a processor configured to: receive outputs from each of the first to third comparators, determine that a combination of the outputs from the first to third comparators corresponds to an invalid state, and indicate a fault in response to determining that the combination of the outputs from the first to third comparators corresponds to the invalid state.

The processor can be further configured to: determine a quadrant of the magnetic field angle sensor based at least in part on the outputs from the first and second comparators.

The received outputs can comprise first outputs received at a first time, and the processor can be further configured to: receive second outputs from each of the first to third comparators at a second time, determine that a transition between a first state including a combination of the first outputs to a second state including a combination of the second outputs corresponds to an invalid transition, and indicate the fault in response to determining that the transition corresponds to an invalid transition.

The first bridge can comprise a sine bridge and the second bridge can comprise a cosine bridge, and the magnetic field turn sensor system can further comprise: a fourth comparator configured to compare a second one of the positive and negative outputs of the sine bridge to a second one of the positive and negative outputs of the cosine bridge, wherein the processor is further configured to: receive an output from the fourth comparator, wherein the determination that the combination of the outputs corresponds to the invalid state is further based on the output from the fourth comparator.

The second one of the positive and negative outputs of the sine bridge can be the same as the first one of the positive and negative outputs of the sine bridge and the second one of the positive and negative outputs of the cosine bridge can be different from the first one of the positive and negative outputs of the cosine bridge.

The processor can be further configured to: determine an octant of the magnetic field angle sensor based at least in part on the outputs from the first to fourth comparators.

The received outputs can comprise first outputs received at a first time, and the processor can be further configured to: receive second outputs from each of the first to fourth comparators at a second time, determine that a transition between a first state including a combination of the first outputs to a second state including a combination of the second outputs corresponds to an invalid transition, and indicate the fault in response to determining that the transition corresponds to an invalid transition.

The system can be configured to consume less power than a power consumption budget provided for diagnostic components of an Electric Power Assisted Steering (ePAS) system.

Yet another aspect is a method for detecting errors in a magnetic field turn sensor system, comprising: receiving outputs from each of first to third comparators, the magnetic field turn sensor system comprising: a magnetic field angle sensor having a first bridge having a positive output and a negative output and a second bridge having a positive output and a negative output, the first comparator configured to compare the positive and negative outputs of the first bridge, the second comparator configured to compare the positive and negative outputs of the second bridge, and the third comparator configured to compare a first one of the positive and negative outputs of the first bridge to a first one of the positive and negative outputs of the second bridge; determining that a combination of the outputs from the first to third comparators corresponds to an invalid state; and indicating a fault in response to determining that the combination of the outputs from the first to third comparators corresponds to the invalid state.

The method can further comprise: determining a quadrant of the magnetic field angle sensor based at least in part on the outputs from the first and second comparators.

The received outputs can comprise first outputs received at a first time, and the method can further comprise: receiving second outputs from each of the first to third comparators at a second time, determining that a transition between a first state including a combination of the first outputs to a second state including a combination of the second outputs corresponds to an invalid transition, and indicating the fault in response to determining that the transition corresponds to an invalid transition.

The first bridge can comprise a sine bridge and the second bridge can comprise a cosine bridge, and the magnetic field turn sensor system can further comprise a fourth comparator configured to compare a second one of the positive and negative outputs of the sine bridge to a second one of the positive and negative outputs of the cosine bridge, and the method can further comprise: receiving an output from the fourth comparator, wherein the determination that the combination of the outputs corresponds to the invalid state is further based on the output from the fourth comparator.

BRIEF DESCRIPTION OF THE DRAWINGS

These drawings and the associated description herein are provided to illustrate specific embodiments of the invention and are not intended to be limiting.

DETAILED DESCRIPTION

Figure 1A:
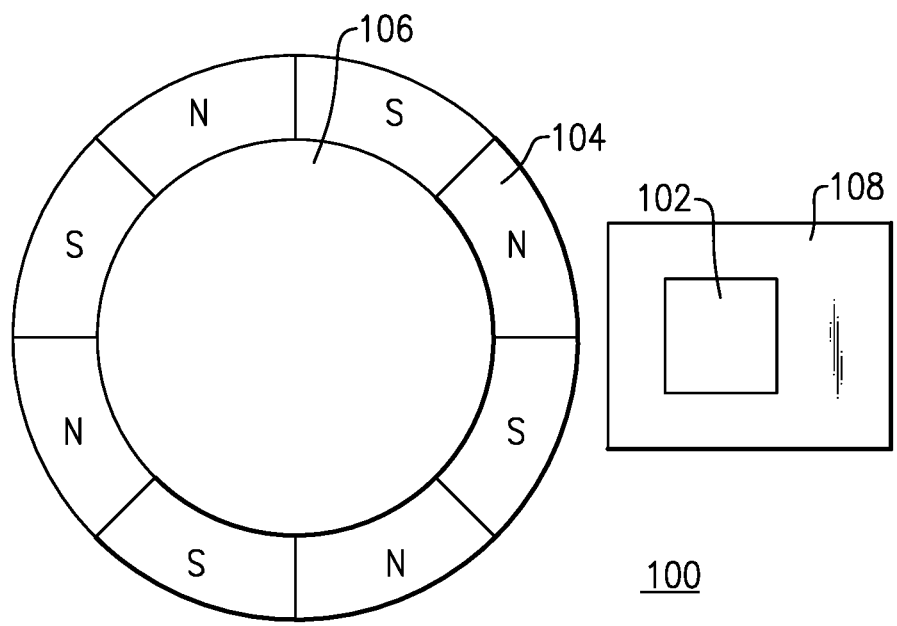
FIGS. 1A and 1B are schematic diagrams of example implementations of an error detecting system according to certain embodiments.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Overview of Magnetic Field Turn Sensor System

Figure 1B:
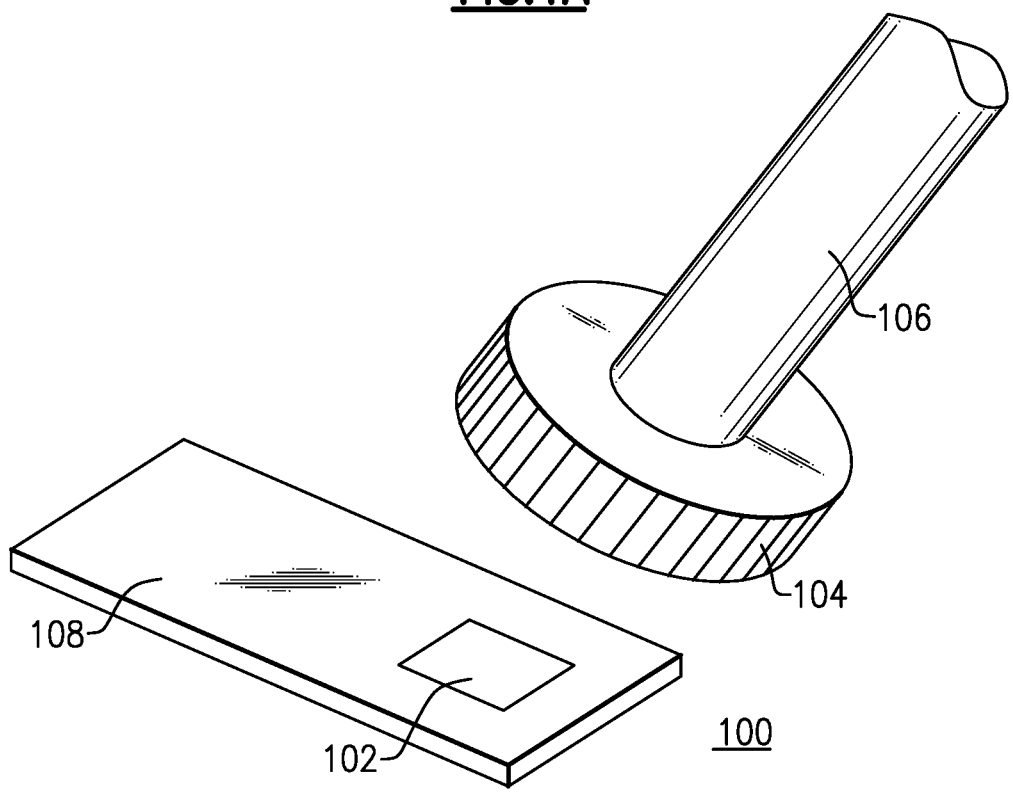

FIGS. 1A and 1B are schematic diagrams of example implementations of an error detecting system according to certain embodiments. The illustrated implementation 100 includes a shaft 106, a magnet 104, a magnetic field turn sensor system or sensing circuit 102, and a circuit board 108. Embodiments of the sensing circuit 102 are further described in connection with FIGS. 2-3 below. The magnet 104 can be attached to the rotating shaft 106. The rotating shaft 106 can be associated with a steering wheel of a motor vehicle in certain implementations. The sensing circuit 102 can sense changes in position of the magnet 104 and provide an indication of rotation of the rotating shaft 106. A position relationship between the sensing circuit 102 and the magnet 104 illustrated in FIGS. 1A and 1B is for illustration purposes. In another embodiment, the implementation can use an end-of-shaft configuration where the magnet 104 can be a dipole magnet located at the end of the shaft 106 and the sensing circuit 102 can be located under the magnet 104. The position relationship can vary. In one embodiment, the sensing circuit 102 can comprise two sensors, i.e., a first sensor and a second sensor. The second sensor can be the same as or different from the first sensor. For example, the second sensor can use different sensing principle and different signal chain design to ensure robustness.

In embodiments, magnetic sensors such as anisotropic magnetoresistive (AMR) sensors, giant magnetoresistive (GMR), or tunneling magnetoresistive (TMR) sensors, or any other suitable magnetoresistive (XMR) sensors can be used to implement the disclosed apparatus and/or methods. In some embodiments, the magnetic sensors can measure the change in resistivity that is proportional to the magnetization direction of a free layer in the magnetoresistive sensor. By using magnetic sensors, such as AMR sensors and TMR sensors, and various combinations of sensing elements of the magnetic sensor, error(s) can be detected.

In certain motor control applications, it is beneficial to monitor the number of turns through which the shaft 106 rotates, even when the motor controller is powered off. Such systems can occur where there is a possibility of the shaft 106 being moved by an external force while the system is powered off. To address this challenge, a low-power circuit (which can be included as a portion of the sensing circuit 102) can be configured to continuously monitor the rotation of the shaft 106 while the rest of the motor control system is powered down.

An example of a system for which it can be beneficial to monitor the rotation or number of turns of a shaft 106 is an Electric Power Assisted Steering (ePAS) system in an automobile. In many ePAS systems, the shaft 106 angle is monitored as part of a motor control function when the system is normally operating. A low-power sensing circuit 102 can also be used to keep track of shaft 106 turns during normal operation.

The number of turns through which the motor shaft 106 has rotated may be a critical variable for certain vehicle functions. For example, errors in a turn count measurement for a steering wheel shaft can result in detection of an incorrect steering angle, which can lead to a hazardous situation. Therefore, it can be important to correctly measure the turn count, and flag any errors in angle measurement to the motor control system. Providing diagnostic coverage to a low-power turn counter is difficult because typical diagnostic techniques may consume additional power. For example, low power rotation sensing circuits 102 may have a limited power consumption budget since consuming too much power while the automobile is off may prematurely drain the automobile battery. Thus, adding error detection diagnostics which consume too much additional power can result in the power usage of the sensing circuits 102 exceeding the power consumption budget.

In this disclosure, the sensing circuit 102 can use angle measurements from one of more signal processing paths to monitor transition angles between quadrants measured by the sensing circuit. Errors in the components of the sensing circuit 102 can be detected by comparing the measured transition angles to expected transition angles. For example, certain errors in the components of the sensing circuit 102 will affect the specific angles at which the sensing circuit 102 transitions between quadrants, which can be detected by comparing the measured transition angles to predetermined expected transition angles.

Aspects of this disclosure can be implemented in a magnetic angle sensor including, for example, the sensing circuit 102. Such a magnetic sensor can include AMR sensing elements and TMR sensing elements, signal conditioning electronics and an interface. Depending on the implementation, the interface may include one or more of the following: serial peripheral interface (SPI), single edge nibble transmission (SENT) interface, peripheral acceleration sensor (PAS) interface, such as PAS4, etc. In one application, the interface can be a PAS interface, such as a PAS4 interface for remote accelerometers used for airbag deployment in vehicles, for communication with a host electronic control unit (ECU). The magnetic angle sensor can be implemented in an automotive ePAS system. Such a system has a functional safety specification defined in accordance with ISO-26262, which is a functional safety standard for road vehicles. The principles and advantages discussed herein can be implemented to detect errors in the turn count measurements of the shaft 106 (e.g., which may be associated with a steering wheel) while the sensing circuit 102 is operating in low-power mode in an ePAS system to satisfy a functional safety specification. In other instances, the illustrated implementation 100 can be used in other systems complying with other specifications or standards, or systems requiring error detection in low-power turn count applications.

As described herein, the magnetic sensor typically includes two full bridges, e.g., a cosine bridge and a sine bridge. Each of the cosine bridge and the sine bridge outputs voltages, i.e., $V_{COS}$ and $V_{SIN}$, respectively. For example, in AMR sensor using single dipole magnet, "electrical angle" can be understood as the angle calculated from arctan $(V_{SIN}/V_{COS})$, and "magnetic angle," that is expressed as $ANGLE_{MAG}$ herein, can be calculated by dividing the "electric angle" by two (2). For an AMR where the two bridges are rotated at approximately 45° from each other, the outputs of the two bridges are sinusoidal with a relative phase shift of approximately 90°, and the sensor's electrical response is twice the magnetic angle. In another example, for a TMR sensor, the "electric angle" can be same as the "magnetic angle." Further, "mechanical angle" can be understood as the angle determined based on the magnet design, which can be reflected in a mechanical-to-magnetic angle transfer function. The "mechanical angle" and "magnetic angle" can be the same or different from each other. For example, in certain embodiments using a single pole-pair magnet, the "mechanical angle" and "magnetic angle" are the same. However, in this and other embodiments, the "mechanical angle" and "magnetic angle" may be different, for example, if the magnetic zero angle is rotated relative to the desired mechanical zero-angle. In embodiments using a multi-pole magnet, such a pole-ring, the "mechanical angle" can be expressed as ($ANGLE_{MAG}/N$), where N is the number of pole pairs.

In some embodiments, the systems and methods disclosed herein may be applied to an apparatus having a rotating shaft, which may include one or more magnetic elements such as dipole or ring magnets. A measurement of the magnetic field by the sensing elements can be used to determine the angle of rotation of the shaft.

Examples of Magnetic Field Turn Sensor Systems and Error Detection Techniques

Figure 2A:
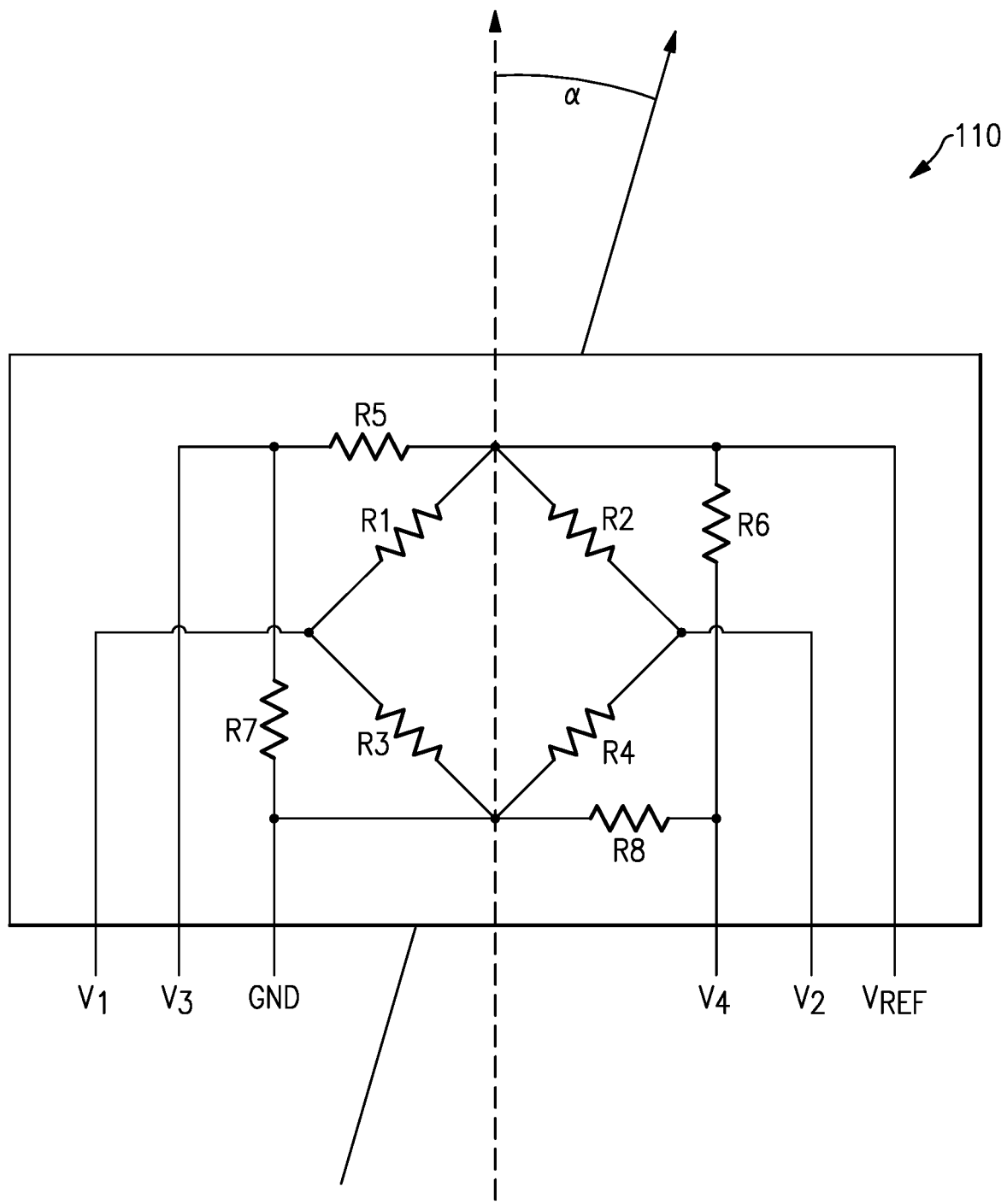
FIG. 2A shows a diagram of example implementation of a first sensor according to one embodiment.

FIG. 2A shows a diagram of example implementation of a first sensor 110 according to one embodiment. A first sensor 110 comprises one or more half bridges. Sensors 110 including two or more half bridges can be configured as one or more full bridges. The example first sensor 110 illustrated in FIG. 2A includes eight sensing elements R1-R8 that are configured as a system of four half bridges. As illustrated in FIG. 2A, the first sensor 110 includes sensing elements R1 and R3 forming a first half bridge having an output V1; sensing elements R2 and R4 forming a second half bridge having a second output V2; sensing elements R5 and R7 forming a third half bridge having an output V3; and sensing elements R6 and R8 forming a fourth half bridge having an output V4.

A plurality of half bridges (or full bridges which are paired half bridges) of the half bridge system can be oriented at an angle relative to one another and configured to be sensitive to magnetic fields in different directions. In FIG. 2A, the full bridge including sensing elements R1-R4 and the full bridge including sensing elements R5-R8 are oriented an angle a relative to each other. In the illustrated embodiment, α=approximately 45°. In an embodiment, each of the two-paired half bridges (which are full bridges) can form individual channels, i.e., first channel and second channel, each of which is a path between the first sensor and an interface. Here, one full bridge can correspond to a cosine bridge and the other bridge can correspond to a sine bridge. For example, the cosine bridge can comprise the sensing elements R1-R4, the sine bridge can comprise the sensing elements R5-R8, where V2−V1=$V_{COS}$ and V4−V3=$V_{SIN}$. One bridge of the sine and the cosine bridges can be included in the first channel, which is a first path from the first sensor 110 to an interface. The other of the sine and cosine bridges can be included in the second channel, which is a second path from the first sensor 110 to the interface. The first path is different and/or separate from the second path. In other embodiments, the system of half bridges may include more or fewer half bridges than the embodiment illustrated in FIG. 2A.

Figure 2B:
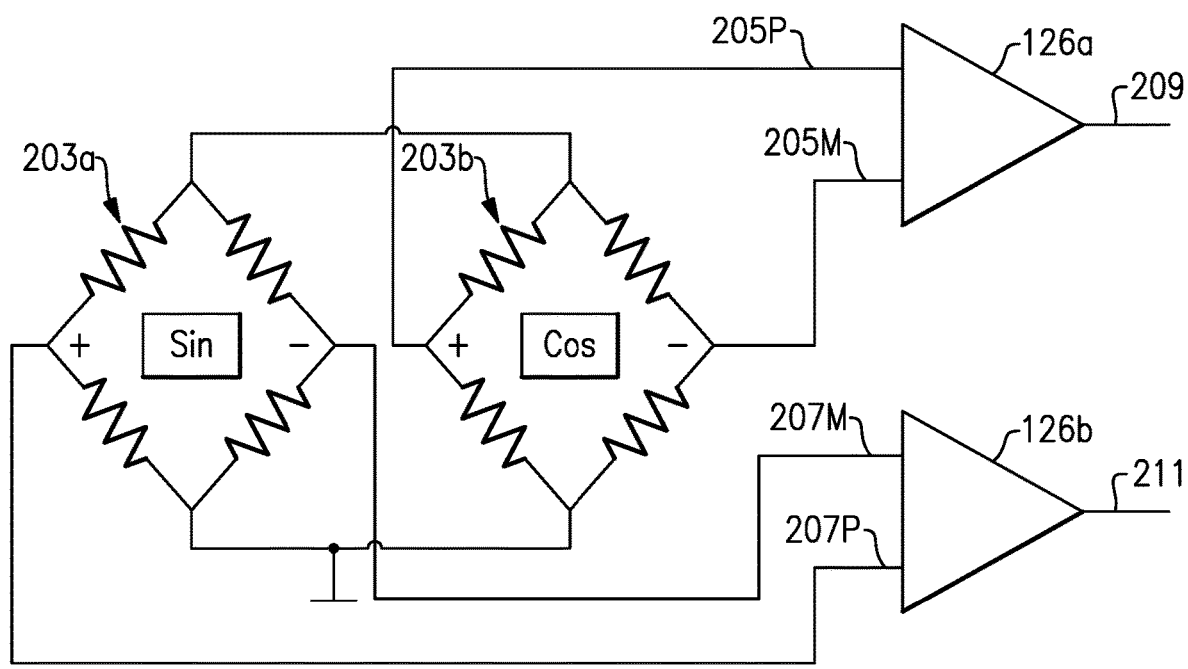
FIG. 2B is a block diagram illustrating a configuration of a plurality of comparators that can be used to determine the quadrant in which the angle of the shaft is current located in accordance with aspects of this disclosure.

FIG. 2B is a block diagram illustrating a configuration of a plurality of comparators 126 that can be used to determine the quadrant in which the angle of the shaft 106 is current located in accordance with aspects of this disclosure. For example, the configuration illustrates a sine full bridge 203a and a cosine full bridge 203b, which may be similar to the full bridges illustrated in FIG. 2A. The sine bridge 203a is configured to generate a positive output 207P and a negative output 207M and the cosine bridge 203b is also configured to generate a positive output 205P and a negative output 205M. The outputs 205P, 205M, 207P, and 207M from the sine and cosine bridges 203a and 203b will vary depending on the current orientation of the magnet 104 on the shaft 106. In more detail, the positive and negative outputs 205P and 205M from the cosine bridge 203b are provided to a first comparator 126a while the positive and negative outputs 207P and 207M from the sine bridge 203a are provided to a second comparator 126b. Although FIG. 2B illustrates a sine bridge 203a and a cosine bridge 203b, aspects of this disclosure are not limited thereto. For example, in some implementations, the configuration may include a first bridge and a second bridge having an offset therebetween, such as: 15°, 30°, 45°, 60°, 75°, 120°, 135°, or any other offset.

Figure 2C:
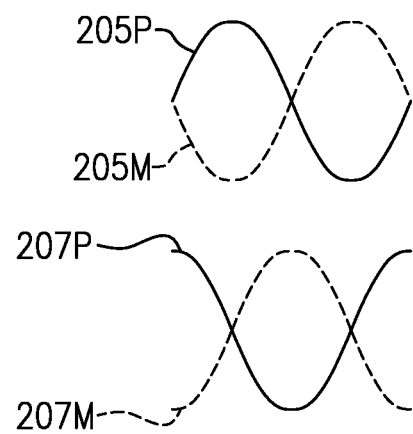
FIGS. 2C and 2D illustrate an example of the first and second outputs from the sine and cosine bridges which are supplied to the first and second comparators in accordance with aspects of this disclosure.
Figure 2D:
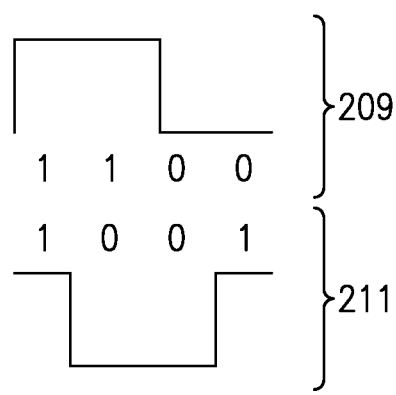

FIGS. 2C and 2D illustrates an example of the outputs 205P, 205M, 207P, and 207M from the sine and cosine bridges 203a and 203b which are supplied to the first and second comparators 126a and 126b in accordance with aspects of this disclosure. As shown in FIG. 2C, each of the outputs 205P, 205M, 207P, and 207M varies as the shaft 106 is rotated through 360°. Taking the positive and negative outputs 205P and 205M from the cosine bridge 203b as an example, the outputs 205P and 205M cross each other as the shaft 106 is rotated at two points separated by 180°. The positive and negative outputs 207P and 207M from the sine bridge 203a also cross each other at two points separated by 180° which are offset from the outputs 205P and 205M from the cosine bridge 203b by 90°. With reference to FIGS. 2B and 2D, the first comparator 126a compares the values of the outputs 205P and 205M from the cosine bridge 203b to produce a first digital output 209 (which is illustrated in both signal and digital representations) and the second comparator 126b compares the values of the outputs 207P and 207M from the sine bridge 203a to provide a second digital output 211 (also shown in signal and digital representations). A processor can use the first and second digital outputs 209 and 211 to identify which quadrant in which the angle of the shaft is currently located.

Figure 3:
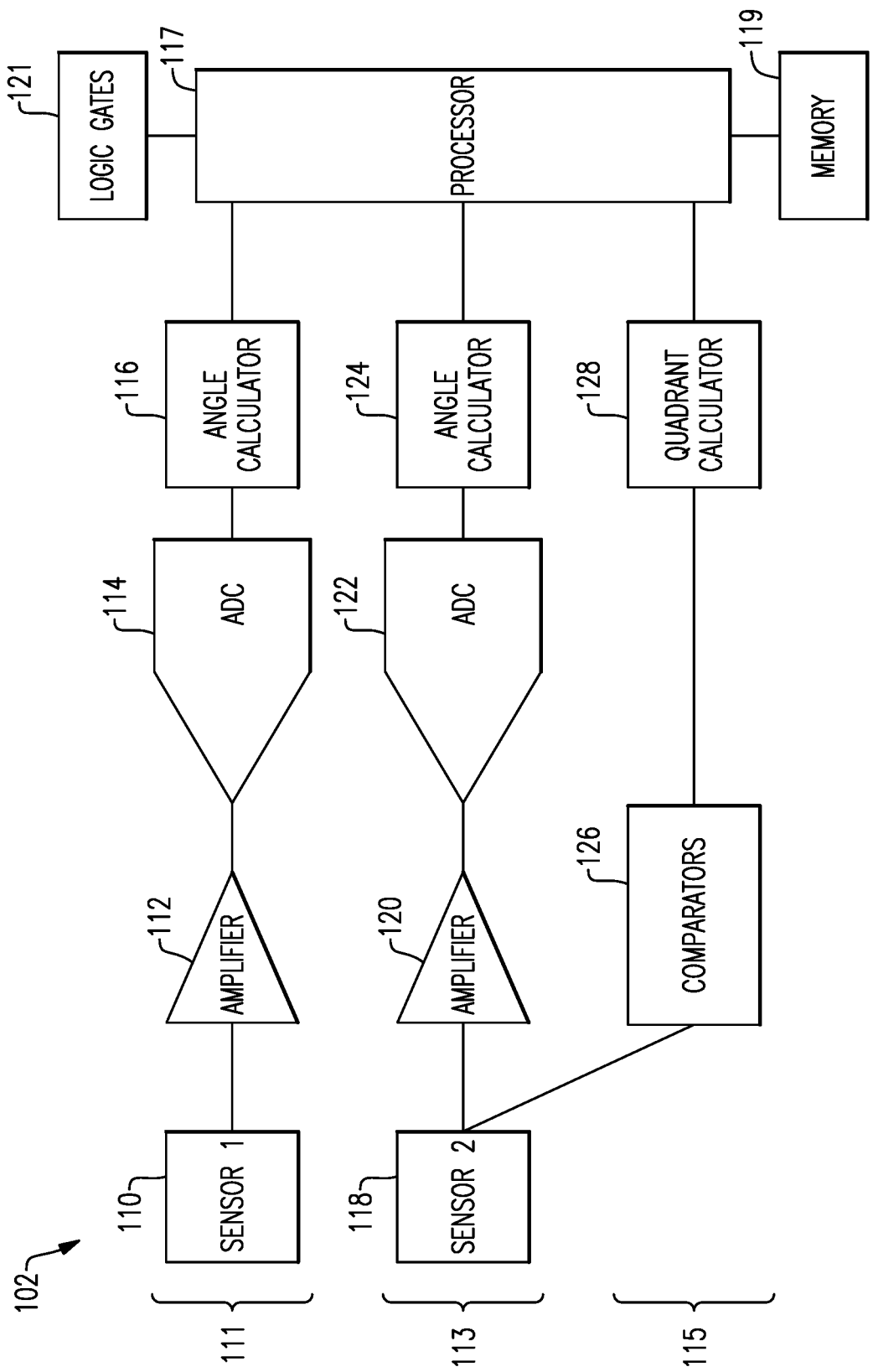
FIG. 3 is a block diagram of an example implementation of a magnetic field turn sensor system configured to detect errors in turn count according to aspects of this disclosure.

FIG. 3 is a block diagram of an example implementation of a magnetic field turn sensor system 102 configured to detect errors in turn count according to aspects of this disclosure. In particular, the magnetic field turn sensor system 102 includes a first signal processing path 111, a second signal processing path 113, a turn count path 115, a processor 117 connected to each of the first and second signal processing paths 111 and 113 and the turn count path 115, a memory 119, and logic gates 121. The first signal processing path 111 includes a first sensor 110, an amplifier 112, an analog-to-digital converter (ADC) 114, and an angle calculator 116. The second signal processing path 113 includes a second sensor 118, an amplifier 120, an ADC 122, and an angle calculator 124. In certain embodiments, the components of the first and second signal processing paths 111 and 113 may be substantially the same. The turn count path 115 includes one or more comparator(s) 126 and a quadrant calculator 128. As shown in FIG. 3, the comparator(s) 126 are configured to receive an output from the second sensor 118 of the second signal processing path 113. However, in other embodiments, the comparator(s) 126 may be configured to receive an output from the first sensor 110 or from both of the first and second sensors 110 and 118.

The memory 119 can be configured to store valid output combinations for one or more of the comparator(s) 126. In some embodiments, the valid output combinations may be stored in the logic gates 121 rather than in the memory 119. The valid output combinations can be used to detect error(s) in the comparator(s) 126, which is described in detail herein.

The processor 117 is configured to receive an angle measurement from each of the first and second processing paths 111 and 113 and a quadrant measurement from the turn count path 115. The processor 117 can determine an angle of the shaft 106 based on the angle measurements received from the first and second processing paths 111 and 113. The processor 117 can also determine a turn count (e.g., a number of turns that the shaft 106 has been rotated with respect to a neutral position which may be defined as a "zero" turn position) by tracking the quadrant measurement from the turn count path 115 over time.

There are a number of potential locations at which errors may occur within the magnetic field turn sensor system 102. Specifically, errors which may ultimately affect the turn count determined by the processor 117 include error(s) occurring in: the second sensor 118, the comparator(s) 126, the quadrant calculator 128, and/or within the processor 117 itself. Accordingly, in order for the processor 117 to flag potential errors in the turn count to the motor control system, aspects of this disclosure relate to systems and techniques that can be used to detect certain errors occurring in the comparator(s) 126, the first sensor 110, the second sensor 118, and/or the connectivity between these components.

While the detection of error(s) in the second sensor 118 and the quadrant calculator 128 are important components for detection of possible errors in the magnetic field turn sensor system 102, aspects of this disclosure focus primarily on the detection of errors within the comparator(s) 126 and may be capable of detecting certain other errors as well (e.g., certain errors in the second sensor 118 may result in similar outputs as a stuck or inverted comparator 126).

With reference to FIG. 2B-2D, the quadrant calculator 128 can determine the quadrant within which the shaft 106 is currently oriented based on the outputs of the first and second comparators 126a and 126b. As shown in FIG. 2B, the first comparator 126a receives outputs 205 from the cosine bridge 203b while the second comparator 126b receives outputs 207 from the sine bridge 203a. The combination of outputs 00, 01, 10, 11 from the first and second comparators 126a and 126b enables the quadrant calculator to differentiate between the quadrants in which the shaft 106 can be oriented. Changes in the quadrant can be used (e.g., by the processor 117) to increment and/or decrement a turn counter.

When there are no errors present in the first and second comparators 126a and 126b, the outputs of the first and second comparators 126a and 126b as the shaft 106 is rotated through quadrants Q1-Q4 is shown in the below table:

TABLE 1

|  | Q1 | Q2 | Q3 | Q4 |
|---|---|---|---|---|
| First Comparator 126a | 1 | 1 | 0 | 0 |
| Second Comparator 126b | 1 | 0 | 0 | 1 |

However, there may be an error in the first comparator 126a that causes the output of the first comparator to be "stuck" at a high value (e.g., "1"). In some instances, the first comparator 126a may fail such that the output of the first comparator 126 does not change, for example, there may be an error in the comparator 126a itself, there may be an error in the sine or cosine bridge 203a, 203b, and/or there may be a broken connection between the sine or cosine bridge 203a, 203b and the comparator 126a. However, there may also be other failure(s) which can cause errors in the output of the comparator 126a. Such an error can result in outputs of the first and second comparators 126a and 126b as the shaft 106 is rotated through quadrants Q1-Q4 which are shown in the below table:

TABLE 2

|  | Q1 | Q2 | Q3 | Q4 |
|---|---|---|---|---|
| First Comparator 126a | 1 | 1 | 1 | 1 |
| Second Comparator 126b | 1 | 0 | 0 | 1 |

As shown above, the outputs of the first and second comparators 126a and 126b as the shaft 106 is rotated through quadrants Q1-Q4 when the first comparator 126a is stuck at a high value shown in Table 2 may not be distinguishable from valid outputs of the first and second comparators 126a and 126b where the shaft is rotated from quadrant Q1 to quadrant Q2 and then rotated back to quadrant Q1, as illustrated in Table 1.

If an error occurring in one of the first and second comparators 126a and 126b is not detected by the magnetic field turn sensor system 102, this may result in unsafe outcomes in some systems (e.g., vehicles using the magnetic field turn sensor system 102 to detect the turn count of a steering wheel).

Figure 4:
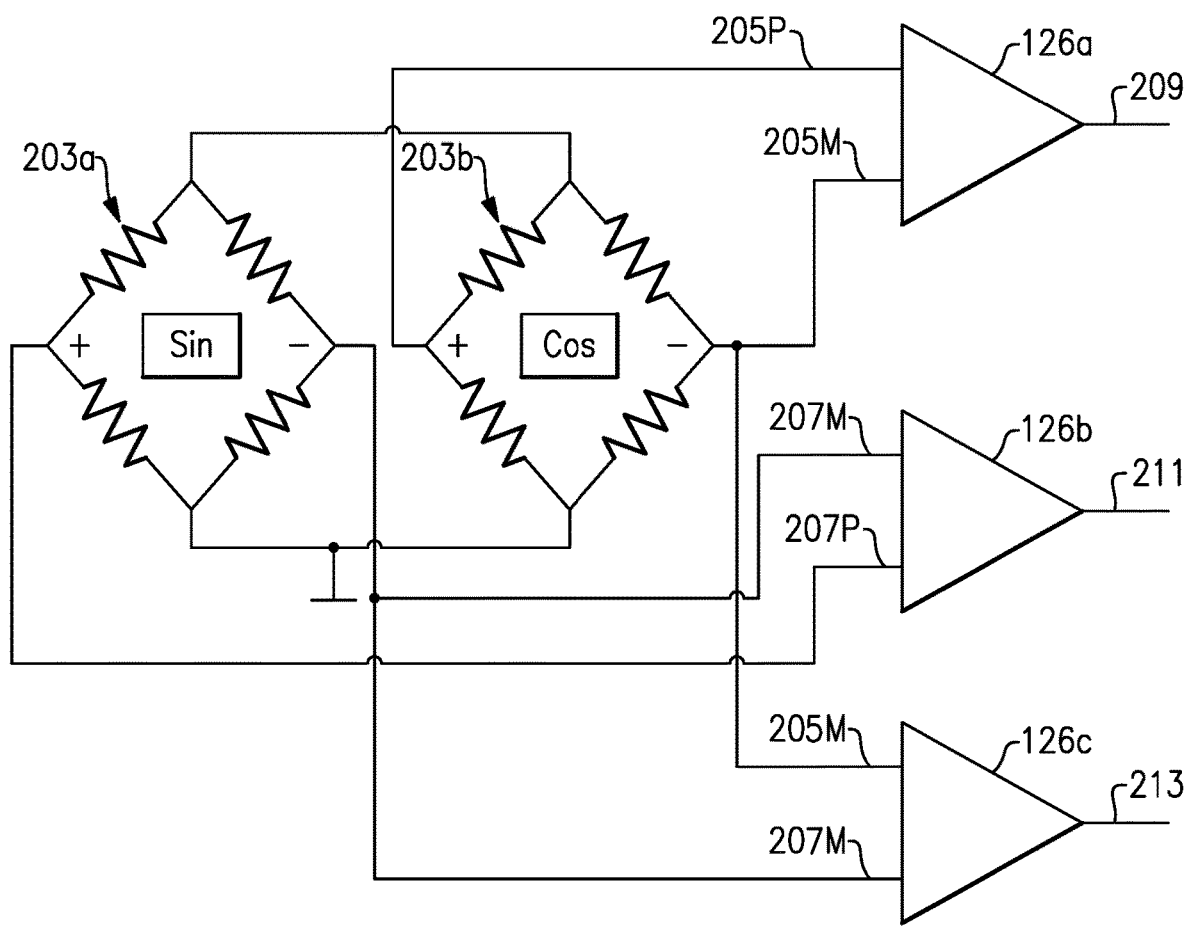
FIG. 4 is a block diagram illustrating an example configuration of a plurality of comparators that can be used to determine the quadrant in which the angle of the shaft is current located in accordance with aspects of this disclosure.

In certain aspects of this disclosure, the magnetic field turn sensor system 102 can further include one or more additional comparators in order to detect potential errors resulting in one of the comparators 126 having a stuck output. FIG. 4 is a block diagram illustrating an example configuration of a plurality of comparators that can be used to determine the quadrant in which the angle of the shaft is currently located in accordance with aspects of this disclosure. Similar to the embodiment of FIG. 2B, in the embodiment of FIG. 4 the configuration illustrates a sine full bridge 203a and a cosine full bridge 203b. Two first outputs 205 from the cosine bridge 203b are provided to a first comparator 126a while the two second outputs 207 from the sine bridge 203a are provided to a second comparator 126b. The configuration further includes a third comparator 126c which can be connected to one of the outputs 205 from the sine bridge 203a and one of the outputs 207 of the cosine bridge 203b. In the FIG. 4 embodiment, the third comparator 126c is connected to the negative outputs 205M and 207M of each of the sine bridge 203a and the cosine bridge 203b. However, the third comparator 126c can be connected to different outputs 205 and 207 of the sine bridge 203a and the cosine bridge 203b depending on the implementation. For example, the third comparator 126 can receive one of the following combinations of outputs from the sine bridge 203a and the cosine bridge 203b: the negative outputs 205M and 207M, the positive outputs 205P and 207P, the positive sine output 207P and the negative cosine output 205M, and the negative sine output 207M and the positive cosine output 205P.

By adding the third comparators 126c to the configuration as shown in FIG. 4, the outputs of the three comparators 126a-126c when there are no errors in the comparators 126 provides the following outputs shown in Table 3 below as the shaft 106 rotates through quadrants Q1-Q4:

TABLE 3

|  | Q1a | Q1b | Q2a | Q2b | Q3a | Q3b | Q4a | Q4b |
|---|---|---|---|---|---|---|---|---|
| First Comparator 126a | 1 | 1 | 1 | 1 | 0 | 0 | 0 | 0 |
| Second Comparator 126b | 1 | 1 | 0 | 0 | 0 | 0 | 1 | 1 |
| Third Comparator 126c | 1 | 0 | 0 | 0 | 0 | 1 | 1 | 1 |

As shown in Table 3, the output 213 of the third comparator 126c is offset from the output of the second comparator 126b by 45°, which results in the output of the third comparator 126c changing about halfway through the first quadrant Q1 and the third quadrant Q3. In detail, Table 3 illustrates octants Q1a-Q4b and the corresponding outputs from each of the first to third comparators 126a-126c. In order to detect deviations from the valid combinations of outputs illustrated in Table 3, the valid output combinations may be stored in the memory 119.

When one of the comparators 126a-126c is stuck at a given output, the combination of outputs from the first to third comparators 126a-126c will result in combinations and/or transitions between combinations which are not valid (e.g., are not present in the error free outputs/transitions shown in Table 3). For example, Table 4 illustrated a pattern of outputs for the first to third comparators 126a-126c in which the first comparator 126a has an output stuck at a high value.

TABLE 4

|  | Q1a | Q1b | Q2a | Q2b | Q3a | Q3b | Q4a | Q4b |
|---|---|---|---|---|---|---|---|---|
| First Comparator 126a | 1 | 1 | 1 | 1 | 1 | 1 | 1 | 1 |
| Second Comparator 126b | 1 | 1 | 0 | 0 | 0 | 0 | 1 | 1 |
| Third Comparator 126c | 1 | 0 | 0 | 0 | 0 | 1 | 1 | 1 |

When the shaft 106 is rotated through a full rotation, the stuck first comparator 126 can be detected by detecting the invalid combination of outputs in octant Q3b. Thus, the processor 117 is able to detect an error in which one of the comparators 126 is stuck if the shaft 106 is rotated through a full rotation. In some implementations, the turn count is a value which indicated the number of full rotations of the shaft 106 from a neutral position. By detecting the error within a full rotation of the shaft, the addition of the third comparator 126b allows this type of error to be detected before the error results in a misdetection of the turn count value.

Figure 5:
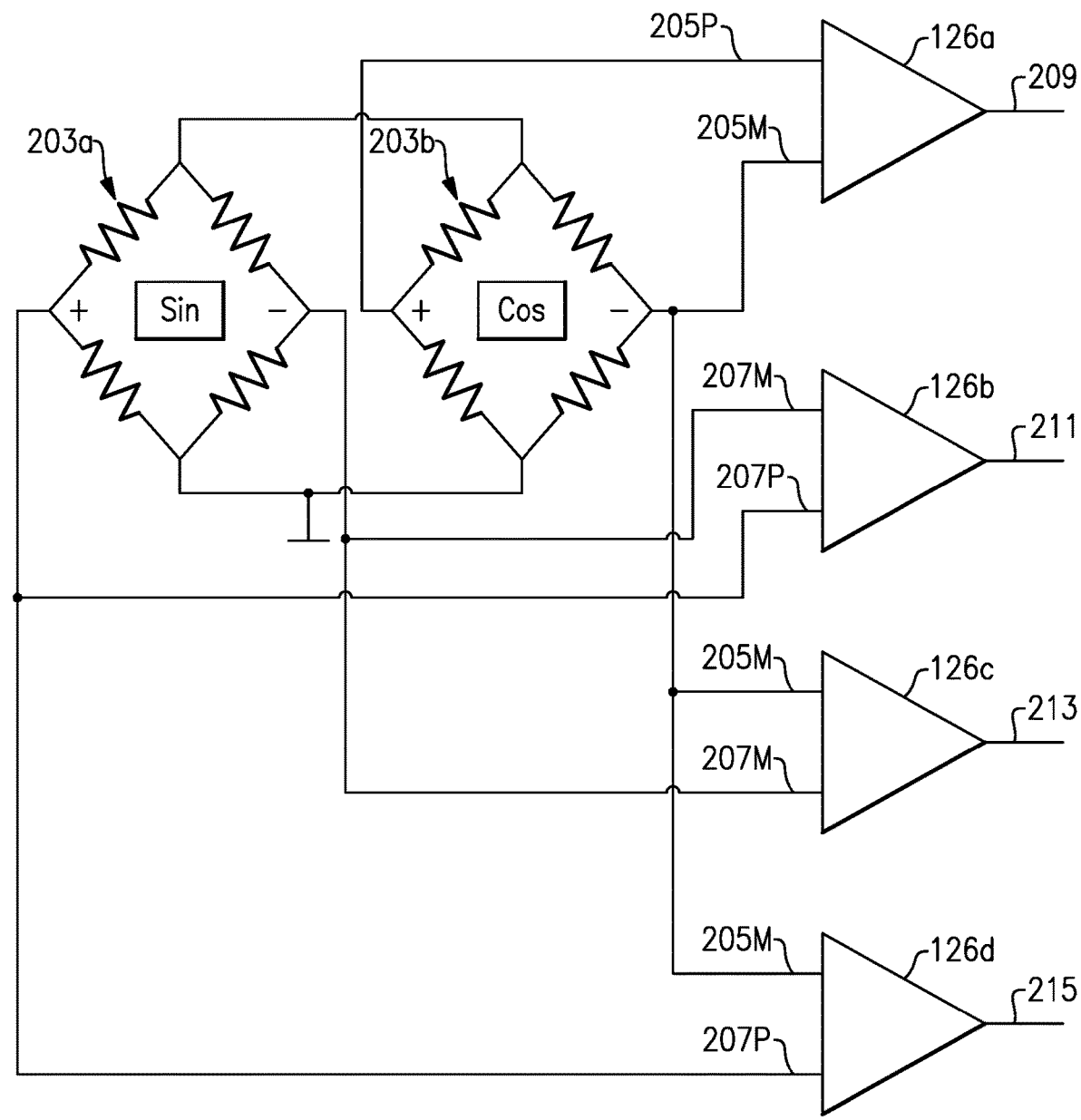
FIG. 5 is a block diagram illustrating another example configuration of a plurality of comparators that can be used to determine the quadrant in which the angle of the shaft is current located in accordance with aspects of this disclosure.

In some implementations, a fourth comparator can further be added to provide additional invalid combinations of outputs and invalid transitions which can be detected by the processor 117. FIG. 5 is a block diagram illustrating another example configuration of a plurality of comparators that can be used to determine the quadrant in which the angle of the shaft is current located in accordance with aspects of this disclosure. In particular, the configuration of FIG. 5 may include similar components to those described above in connection with FIG. 4 with the addition of a fourth comparator 126d. The fourth comparator 126d is connected to the negative output 205M of the cosine bridge 203b and the positive output 207P of the sine bridge 203a. Thus, the transitions between quadrants detected by the fourth comparator 126d are offset 180° from the transitions detected by the third comparator 126c. The following table illustrates a pattern of outputs for the four comparators of FIG. 5 as the shaft rotates a full rotation though the octants Q1a-Q4b without any errors:

TABLE 5

|  | Q1a | Q1b | Q2a | Q2b | Q3a | Q3b | Q4a | Q4b |
|---|---|---|---|---|---|---|---|---|
| First Comparator 126a | 1 | 1 | 1 | 1 | 0 | 0 | 0 | 0 |
| Second Comparator 126b | 1 | 1 | 0 | 0 | 0 | 0 | 1 | 1 |
| Third Comparator 126c | 1 | 0 | 0 | 0 | 0 | 1 | 1 | 1 |
| Fourth Comparator 126d | 1 | 1 | 1 | 0 | 0 | 0 | 0 | 1 |

When a fault is present on the first comparator, the following pattern of outputs can result:

TABLE 6

|  | Q1a | Q1b | Q2a | Q2b | Q3a | Q3b | Q4a | Q4b |
|---|---|---|---|---|---|---|---|---|
| First Comparator 126a | 1 | 1 | 1 | 1 | 1 | 1 | 1 | 1 |
| Second Comparator 126b | 1 | 1 | 0 | 0 | 0 | 0 | 1 | 1 |
| Third Comparator 126c | 1 | 0 | 0 | 0 | 0 | 1 | 1 | 1 |
| Fourth Comparator 126d | 1 | 1 | 1 | 0 | 0 | 0 | 0 | 1 |

As can be seen from Table 6, each of the outputs for octant Q3b and Q4a are invalid combinations. Thus, the processor 117 can detect each of these patterns of outputs as resulting from an error in one of the comparators 126. In order to detect deviations from the valid combinations of outputs illustrated in Table 5, the valid output combinations may be stored in the memory 119. In other embodiments, the valid output combinations may be implemented via a plurality of logic gates 121.

In addition, for certain selections of outputs provided to the third and fourth comparators 126c and 126d along with one of the comparators 126a-126d being stuck at either a high or low output may result in invalid transitions between valid output combinations. Thus, in response to detecting a transition between two valid states, the processor 117 can also be configured to determine whether the transition is valid. For example, if the outputs corresponding to a transition indicates that the shaft 106 has gone from octant Q3b to octant Q4b without first going to octant Q4a, the processor 117 can determine that an error has occurred. The detection of invalid transitions between valid output combinations can also be applied to a system having a different number of comparators 126 (e.g., 2, 3, 5 or more comparators 126).

Figure 6:
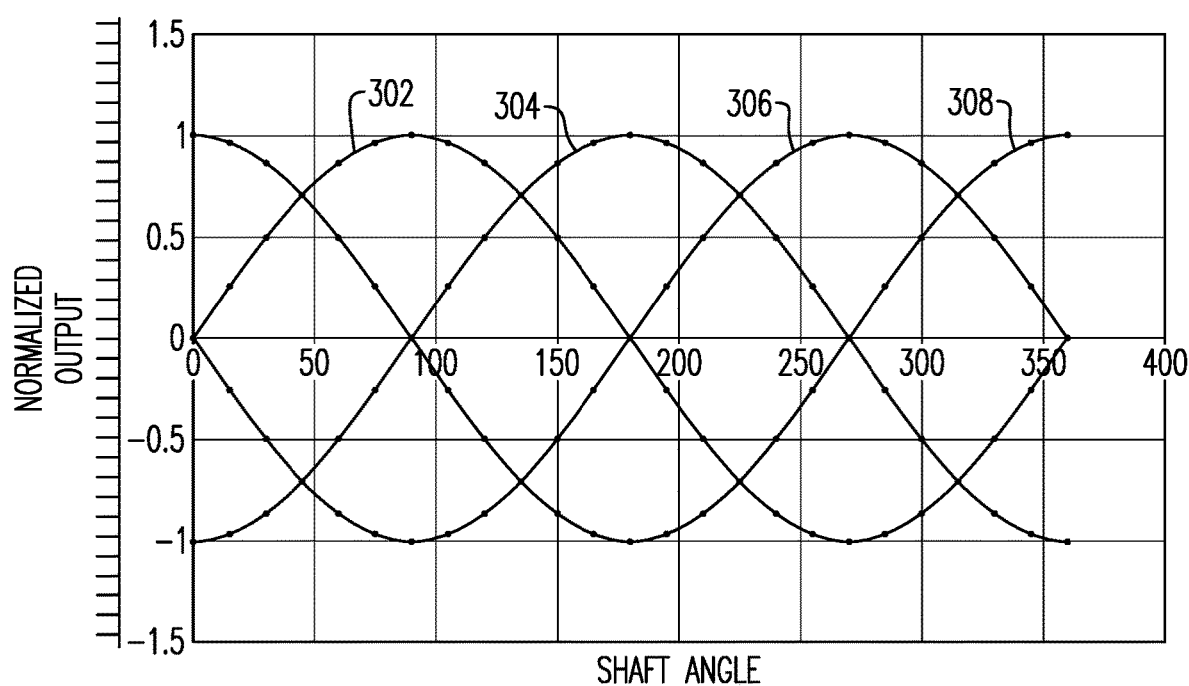
FIG. 6 is a graph illustrating the normalized output with respect to shaft angle of the sine and cosine bridges and in accordance with aspects of this disclosure.

FIG. 6 is a graph illustrating the normalized output with respect to shaft angle of the sine and cosine bridges 203a and 203b in accordance with aspects of this disclosure. In particular, line 302 is the positive sine output 207P, line 304 is the negative cosine output 205M, line 306 is the negative sine output 207M, and line 308 is the positive cosine output 205P. With reference to FIG. 5, the first comparator 126a receives the positive and negative cosine outputs 205P and 205M and the second comparator 126b receives the positive and negative sine outputs 207P and 207N. In order to provide a pattern of outputs having invalid states when one of the comparators 126 is stuck, the inputs to the third and fourth comparators 126c and 126d should be offset from the first and second comparators 126a and 126b and from each other. Thus, in certain implementations, the third comparator 126c can receive one of: the positive sine output 207P and the positive cosine output 205P, or the negative sine output 207M and the negative cosine output 205M, while the fourth comparator 126d can receive one of: the positive sine output 207P and the negative cosine output 205M, or the negative sine output 207M and the positive cosine output 205P. In other implementations, the inputs to the third and fourth comparators 126c and 126d can be reversed.

Figure 7:
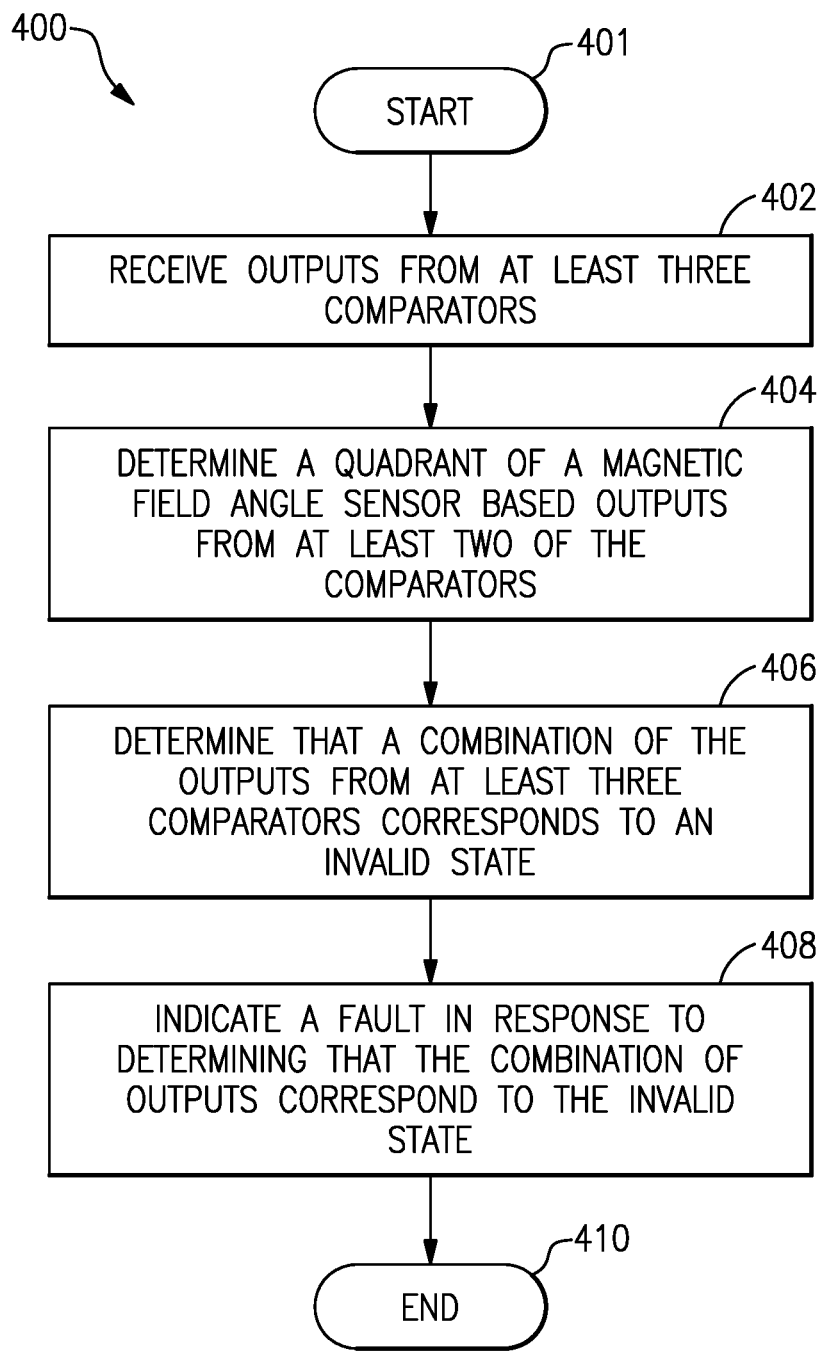
FIG. 7 is a flowchart of an example implementation of a method for detecting errors in the comparators in accordance with aspects of this disclosure.

FIG. 7 is a flowchart of an example implementation of a method 400 for detecting errors in the comparators 126 in accordance with aspects of this disclosure. The method 400 may be performed by the processor 117 of the magnetic field turn sensor system 102. However, in other embodiments, certain blocks of the method 400 may instead be performed by other components which may be located, for example, on the circuit board 108. In addition, although the block are illustrated and described in a particular order, certain blocks may be performed in other orders without departing from aspects of this disclosure.

The method 400 begins at block 401. At block 402, the processor 117 receives outputs from each of at least three comparators 126a-126c of the magnetic field turn sensor system 102. Depending on the implementation, the at least three comparators 126a-126d may be configured as shown in one of FIG. 4 or 5. At block 404, the processor 117 determines a quadrant of the magnetic field angle sensor 102 based at least in part on the outputs from at least two of the comparators, for example, based on outputs of the first and second comparators 126a and 126b.

At block 406, the processor 117 determines that a combination of the outputs from the at least three comparators 126a-126c corresponds to an invalid state. For example, when the combination of outputs from the first to third comparators 126a-126c does not match a predetermined combination of valid values, the processor 117 may determine that the combination of outputs corresponds to an invalid state. In implementations including three comparators 126a-126c, the combinations of valid states may be similar to the values illustrated in Table 3. In implementations including four comparators 126a-126d, the combinations of valid states may be similar to the values illustrated in Table 5, and may provide a greater number of possible invalid states that can be detected by the processor 117 compared to an implementation including three comparators 126a-126d. For example, the valid output combinations may be stored in the memory 119 so that the processor 117 can determine whether any given combination of outputs corresponds to a valid or invalid state. In some implementations, such as those that use a comparator circuit that employs chopping (e.g., as discussed below in connection with FIG. 8), the processor 117 can also determine that a transition between a first state to a second state corresponds to an invalid transition based on the outputs of the at least three comparators taken at successive points in time.

In some implementations, the order of blocks 404 and 406 can be reversed. For example, the processor 117 may first determine that a combination of the outputs from the at least three comparators 126a-126c corresponds to a valid state (e.g., similar to block 406 described above). In response to determining that the combination of outputs corresponds to the valid state, the processor 117 may determines a quadrant of the magnetic field angle sensor 102 based at least in part on the outputs from at least two of the comparators (similar to block 404 described above).

At block 408, the processor 117 indicates a fault in response to determining that the combination of the outputs from at least three comparators corresponds to the invalid state. In some implementations, the processor 117 can also indicate the fault in response to determining that the transition corresponds to an invalid transition. The method 400 ends at block 410.

Figure 8:
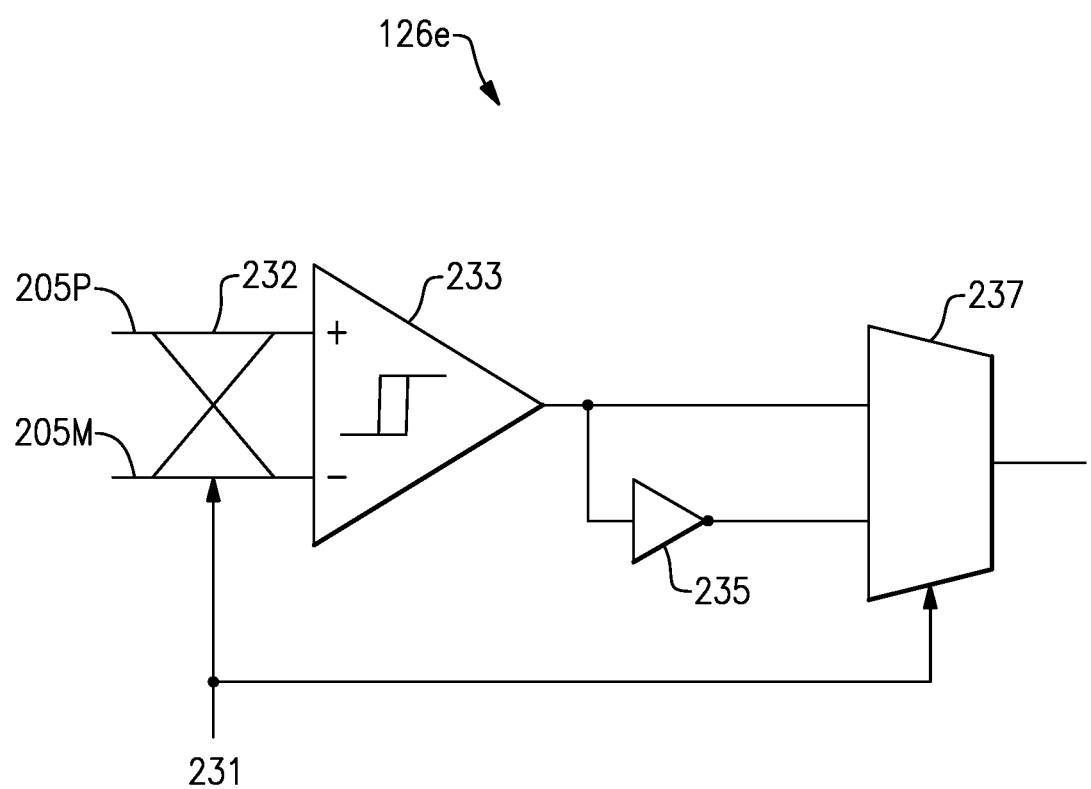
FIG. 8 is a block diagram illustrating an embodiment of a comparator that employs chopping that can be used in the magnetic field turn sensor system in accordance with aspects of this disclosure.

Aspects of this disclosure can also be applied to magnetic field turn sensor systems 102 having comparators 126e that employ chopping. FIG. 8 is a block diagram illustrating an embodiment of a comparator 126e that employs chopping that can be used in the magnetic field turn sensor system 102 in accordance with aspects of this disclosure. For example, the comparator 126e illustrated in FIG. 8 can be used in place of each of the comparators 126a-126d illustrated in FIGS. 4 and 5 in certain implementations.

Similar to the comparators 126a-126d described above, the comparator 126e of FIG. 8 can receive two output signals 205P, 205M, 207P, and 207M from the sine and/or cosine bridges 203a and 203b. In the illustrated example, the comparator 126e receives positive and negative outputs 205P and 205M from the cosine bridge 203b. The comparator 126e includes a chop switch 232 configured to receive the positive and negative outputs 205P and 205M and a chop signal 231. A comparator 233 is configured to receive outputs from the chop switch 232 and output a digital signal representative of which of the positive and negative outputs 205P and 205M has a greater value. For example, the comparator 233 provides a "1" or high output for one input signal or magnetic angle when 205P goes to the positive input and 205M goes to the negative input as controlled by the chopping switch 232 and the state of the chop signal 231, and provides a "0" or low output for the same input signals or magnetic angle when 205P goes to the negative input of comparator 233, and 205M goes to the positive input as controlled by the chopping switches for the opposite state of the chop signal 231.

The comparator 126e further includes a multiplexor 237 configured to receive the output from the comparator 233 as well as an inverted signal through an inverter 235. The multiplexor 237 is configured to select one of the comparator 233 output or the inverted comparator 233 output based on the chop signal 231. The multiplexor 237 provide part of the chopping of the output from the comparator 233. In some implementations, the comparator 126e may not include the multiplexor 237, and instead, the output and inverted output from the comparator 233 can be provided in digital form directly to the processor 117.

When a fault is present on a first comparator for a magnetic field turn sensor system 102 including four comparators that employ chopping such as the comparator 126e of FIG. 8, (e.g., the comparators can be arranged as shown in FIG. 5), the following pattern of outputs shown in Table 6 can result. In Table 6, the left sub-columns indicate the comparator outputs for high chop while the right sub-columns indicate the comparator outputs for low chop.

TABLE 6

| | Q1a | | Q1b | | Q2a | | Q2b | | Q3a | | Q3b | | Q4a | | Q4b | |
|---|---|---|---|---|---|---|---|---|---|---|---|---|---|---|---|---|
| First Comparator | 1 | 0 | 1 | 0 | 1 | 0 | 1 | 0 | 1 | 0 | 1 | 0 | 1 | 0 | 1 | 0 |
| Second Comparator | 0 | 0 | 0 | 0 | 0 | 0 | 1 | 1 | 1 | 1 | 1 | 1 | 1 | 1 | 0 | 0 |
| Third Comparator | 0 | 0 | 0 | 0 | 1 | 1 | 1 | 1 | 1 | 1 | 1 | 0 | 0 | 0 | 0 | 0 |
| Fourth Comparator | 0 | 0 | 0 | 0 | 0 | 0 | 0 | 0 | 1 | 1 | 1 | 1 | 1 | 1 | 1 | 1 |
| Valid State/ Transition | X | 1 | 1 | X | X | 0 | X | 0 | X | 1 | X | X | 0 | X | 0 | X |

In Table 6, at the Valid State/Transition row, combinations of outputs having an invalid state are marked with "0," invalid transitions between states are marked with "X," and valid states are marked with "1." As can be seen from Table 6, a single comparator having a stuck output will generate a large number of invalid states and transitions such that a stuck comparator error can be detected even without a full rotation of the shaft 106 through 360°.

Conclusion

Aspects of this disclosure can be implemented in various electronic devices. Examples of the electronic devices can include, but are not limited to, consumer electronic products, parts of the consumer electronic products, electronic test equipment, vehicular electronics systems, etc. Examples of the electronic devices can include, but are not limited to, computing devices, communications devices, electronic household appliances, automotive electronics systems, etc. Further, the electronic devices can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description of Certain Embodiments using the singular or plural number may also include the plural or singular number respectively. Where the context permits, the word "or" in reference to a list of two or more items is intended to cover all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a Table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A magnetic field turn sensor system, comprising:
a magnetic field angle sensor having a first bridge having a positive output and a negative output and a second bridge having a positive output and a negative output;
a first comparator configured to compare the positive and negative outputs of the first bridge and generate a first digital output;
a second comparator configured to compare the positive and negative outputs of the second bridge and generate a second digital output;
a third comparator configured to compare a first one of the positive and negative outputs of the first bridge to a first one of the positive and negative outputs of the second bridge and generate a third digital output; and
a processor configured to:
receive the first to third digital outputs from each of the first to third comparators,
determine that a combination of the first to third digital outputs from the first to third comparators corresponds to an invalid state, the invalid state including an invalid combination of the first to third digital outputs, and
indicate a fault in response to determining that the combination of the first to third digital outputs from the first to third comparators corresponds to the invalid state.

2. The system of claim 1, wherein the processor is further configured to:
determine a quadrant of the magnetic field angle sensor based at least in part on the first and second digital outputs from the first and second comparators.

3. The system of claim 1, wherein the received first to third digital outputs are received at a first time, the processor is further configured to:
receive subsequent first to third digital outputs from the first to third comparators at a second time,
determine that a transition between a first state including a combination of the first to third digital outputs received at the first time to a second state including a combination of the subsequent first to third digital outputs received at the second time corresponds to an invalid transition, and
indicate the fault in response to determining that the transition corresponds to an invalid transition.

4. The system of claim 1, wherein the first bridge comprises a sine bridge and the second bridge comprises a cosine bridge.

5. The system of claim 4, further comprising:
a fourth comparator configured to compare a second one of the positive and negative outputs of the sine bridge to a second one of the positive and negative outputs of the cosine bridge and generate a fourth digital output, wherein the processor is further configured to:
receive the fourth digital output from the fourth comparator, and
determine that a combination of the first to fourth digital outputs corresponds to the invalid state.

6. The system of claim 5, wherein the second one of the positive and negative outputs of the sine bridge is the same as the first one of the positive and negative outputs of the sine bridge and the second one of the positive and negative outputs of the cosine bridge is different from the first one of the positive and negative outputs of the cosine bridge.

7. The system of claim 5, wherein the processor is further configured to:
determine an octant of the magnetic field angle sensor based at least in part on the first to fourth digital outputs from the first to fourth comparators.

8. The system of claim 7, wherein the received first to fourth digital outputs are received at a first time, wherein the processor is further configured to:
receive subsequent first to fourth digital outputs from the first to fourth comparators at a second time,
determine that a transition between a first state including a combination of the first to fourth digital outputs received at the first time to a second state including a combination of the subsequent first to fourth digital outputs received at the second time corresponds to an invalid transition, and
indicate the fault in response to determining that the transition corresponds to an invalid transition.

9. The system of claim 1, wherein the first comparator comprises:
a chop switch configured to receive the positive and negative outputs of the first bridge and a chop signal,
a chop comparator configured to receive an output from the chop switch and output a digital signal representative of which of the positive and negative outputs of the first bridge has a greater value,
an inverter configured to invert the digital signal output from the chop comparator, and
a multiplexor configured to receive the digital signal, the inverted digital signal, and the chop signal and output one of the digital signal and the inverted digital signal based on the chop signal.

10. A motor control system configured to control a vehicle, comprising:
a shaft connected to a steering wheel of the vehicle; and
a magnetic field turn sensor system comprising: a magnetic field angle sensor having a first bridge having a positive output and a negative output and a second bridge having a positive output and a negative output, a first comparator configured to compare the positive and negative outputs of the first bridge and generate a first digital output, a second comparator configured to compare the positive and negative outputs of the second bridge and generate a second digital output, a third comparator configured to compare a first one of the positive and negative outputs of the first bridge to a first one of the positive and negative outputs of the second bridge and generate a third digital output, and a processor configured to:
receive the first to third digital outputs from each of the first to third comparators,
determine that a combination of the first to third digital outputs from the first to third comparators corresponds to an invalid state, the invalid state including an invalid combination of the first to third digital outputs, and
indicate a fault in response to determining that the combination of the first to third digital outputs from the first to third comparators corresponds to the invalid state.

11. The system of claim 10, wherein the processor is further configured to:

determine a quadrant of the magnetic field angle sensor based at least in part on the first and second digital outputs from the first and second comparators.

12. The system of claim 10, wherein the received first and second digital outputs are received at a first time, the processor is further configured to:
receive subsequent first to third digital outputs from each of the first to third comparators at a second time,
determine that a transition between a first state including a combination of the first to third digital outputs received at the first time to a second state including a combination of the subsequent first to third digital outputs received at the second time corresponds to an invalid transition, and
indicate the fault in response to determining that the transition corresponds to an invalid transition.

13. The system of claim 10, wherein the first bridge comprises a sine bridge and the second bridge comprises a cosine bridge, and wherein the magnetic field turn sensor system further comprises:
a fourth comparator configured to compare a second one of the positive and negative outputs of the sine bridge to a second one of the positive and negative outputs of the cosine bridge and generate a fourth digital output, wherein the processor is further configured to:
receive the fourth digital output from the fourth comparator, and
determine that a combination of the first to fourth digital outputs corresponds to the invalid state.

14. The system of claim 13, wherein the second one of the positive and negative outputs of the sine bridge is the same as the first one of the positive and negative outputs of the sine bridge and the second one of the positive and negative outputs of the cosine bridge is different from the first one of the positive and negative outputs of the cosine bridge.

15. The system of claim 13, wherein the processor is further configured to:
determine an octant of the magnetic field angle sensor based at least in part on the first to fourth digital outputs from the first to fourth comparators.

16. The system of claim 13, wherein the received first to fourth digital outputs are received at a first time, wherein the processor is further configured to:
receive subsequent first to fourth digital outputs from each of the first to fourth comparators at a second time,
determine that a transition between a first state including a combination of the first to fourth digital outputs received at the first time to a second state including a combination of the subsequent first to fourth digital outputs received at the second time corresponds to an invalid transition, and
indicate the fault in response to determining that the transition corresponds to an invalid transition.

17. A method for detecting errors in a magnetic field turn sensor system, comprising:
receiving first to third digital outputs from each of first to third comparators, the magnetic field turn sensor system comprising: a magnetic field angle sensor having a first bridge having a positive output and a negative output and a second bridge having a positive output and a negative output, the first comparator configured to compare the positive and negative outputs of the first bridge and generate the first digital output, the second comparator configured to compare the positive and negative outputs of the second bridge and generate the second digital output, and the third comparator configured to compare a first one of the positive and negative outputs of the first bridge to a first one of the positive and negative outputs of the second bridge and generate the third digital output;
determining that a combination of the first to third digital outputs from the first to third comparators corresponds to an invalid state, the invalid state including an invalid combination of the first to third digital outputs; and
indicating a fault in response to determining that the combination of the first to third digital outputs from the first to third comparators corresponds to the invalid state.

18. The method of claim 17, further comprising:
determining a quadrant of the magnetic field angle sensor based at least in part on the first and second digital outputs from the first and second comparators.

19. The method of claim 17, wherein the received first to third digital outputs are received at a first time, the method further comprising:
receiving subsequent first to third digital outputs from each of the first to third comparators at a second time,
determining that a transition between a first state including a combination of the first to third digital outputs received at the first time to a second state including a combination of the subsequent first to third digital outputs received at the second time corresponds to an invalid transition, and
indicating the fault in response to determining that the transition corresponds to an invalid transition.

20. The method of claim 17, wherein the first bridge comprises a sine bridge and the second bridge comprises a cosine bridge, and wherein the magnetic field turn sensor system further comprises a fourth comparator configured to compare a second one of the positive and negative outputs of the sine bridge to a second one of the positive and negative outputs of the cosine bridge and generate a fourth digital output, the method further comprising:
receiving the fourth digital output from the fourth comparator, and
determine that a combination of the first to fourth digital outputs corresponds to the invalid state.

* * * * *